United States Patent [19]
Höss

[11] Patent Number: 5,861,836
[45] Date of Patent: Jan. 19, 1999

[54] CIRCUIT CONFIGURATION HAVING RADAR EQUIPMENT FOR DETERMINING A DISTANCE OR A RELATIVE SPEED

[75] Inventor: Alfred Höss, Tegernheim, Germany

[73] Assignee: Siemens Aktiengesellschaft, Munich, Germany

[21] Appl. No.: 835,494

[22] Filed: Apr. 8, 1997

[30]     Foreign Application Priority Data

Aug. 8, 1995 [DE] Germany ................... 195 29 180.8

[51] Int. Cl.⁶ .................... G01S 13/42; G01S 13/64; G01S 13/92
[52] U.S. Cl. ................................ 342/70; 342/109
[58] Field of Search ................ 342/70, 71, 72, 342/109

[56]             References Cited

U.S. PATENT DOCUMENTS

| | | | |
|---|---|---|---|
| 3,893,114 | 7/1975 | Yamanaka et al. | 342/72 |
| 4,901,083 | 2/1990 | May et al. | 342/128 |
| 5,087,918 | 2/1992 | May et al. | 342/85 |
| 5,227,784 | 7/1993 | Masamori et al. | 340/903 |
| 5,274,380 | 12/1993 | Yatsuka et al. | 342/70 |
| 5,381,153 | 1/1995 | Saito et al. | 342/70 |
| 5,400,032 | 3/1995 | Asbury et al. | 342/70 |
| 5,420,792 | 5/1995 | Butsuen et al. | 364/426.04 |
| 5,448,244 | 9/1995 | Komatsu et al. | 342/155 |
| 5,517,197 | 5/1996 | Algeo et al. | 342/70 |
| 5,606,737 | 2/1997 | Suzuki et al. | 455/319 |
| 5,677,695 | 10/1997 | Suzuki et al. | 342/109 |

FOREIGN PATENT DOCUMENTS

| | | |
|---|---|---|
| 95/14939 | 6/1995 | WIPO . |
| 95/20169 | 7/1995 | WIPO . |

OTHER PUBLICATIONS

Japanese Patent Abstract No. 6051057 (Kanako et al.), dated Feb. 25, 1994.

*Primary Examiner*—John B. Sotomayor
*Attorney, Agent, or Firm*—Herbert L. Lerner; Laurence A. Greenberg

[57]             ABSTRACT

A circuit configuration has a radar equipment for determining a distance or a relative speed. The radar equipment continuously transmits frequency-modulated signals, at modulation rates of different size, depending on the speed of the vehicle in which the radar equipment is installed. A higher modulation rate produces better range resolution for a constant maximum analog frequency, which is advantageous particularly in the low speed range.

7 Claims, 2 Drawing Sheets

CIRCUIT CONFIGURATION HAVING RADAR EQUIPMENT FOR DETERMINING A DISTANCE OR A RELATIVE SPEED

CROSS-REFERENCE TO RELATED APPLICATIONS

This application is a continuation of application Ser. No. PCT/DE96/01208, filed Jul. 5, 1996.

BACKGROUND OF THE INVENTION

1. Field of the Invention

The invention relates to a circuit configuration having a radar equipment for determining a distance or a relative speed between a vehicle in which the circuit configuration is disposed and an object, in particular another vehicle, the radar equipment emitting a frequency-modulated radar signal, receiving a reflected radar signal and determining the distance or the relative speed from a comparison of the emitted radar signal with the received radar signal.

Circuit configurations having a radar equipment for determining a distance or a relative speed are used in vehicles in order to make the driver aware of dangerous situations and in order to intervene automatically in the control of functions of the vehicle, such as braking and engine or airbag initiation.

The traffic situation in towns with stop-and-go traffic makes it necessary to measure the distance to a preceding vehicle, particularly at close range, that is to say between 0 and 10meters, quickly and accurately since accurate information about the distance is necessary, particularly at that range.

In a radar equipment which emits a continuously frequency-modulated radar signal that is already known from Published International Application Patent PCT/DE94/01382, corresponding to allowed U.S. application Ser. No. 08/651,564, filed May 22, 1996, different modulation rates are used for close range and for long range. At close range between 0 and 40 meters, mirror-image frequencies are suppressed by using a high modulation rate. The long range up to 400 meters is measured using a low modulation rate.

SUMMARY OF THE INVENTION

It is accordingly an object of the invention to provide a circuit configuration having radar equipment for determining a distance or a relative speed, which overcomes the hereinafore-mentioned disadvantages of the heretofore-known devices of this general type and which is matched to different vehicle speeds.

With the foregoing and other objects in view there is provided, in accordance with the invention, a circuit configuration, comprising a speed sensor disposed on a vehicle in which the circuit configuration is disposed, for measuring the speed of the vehicle; and a radar equipment for determining a distance or a relative speed between the vehicle and an object, in particular another vehicle; the radar equipment emitting a frequency-modulated radar signal, receiving a reflected radar signal and determining the distance or the relative speed from a comparison of the emitted radar signal with the received radar signal; and the radar equipment varying the frequency of the radar signal at a modulation rate depending on the speed of the vehicle and rising as the speed of the vehicle reduces.

A major advantage of the invention is the fact that the modulation rate of the radar equipment is matched to the speed of the vehicle. This results in the range and the accuracy of the radar equipment being matched to the speed of the vehicle, and more accurate information thus being available about the distance and the relative speed.

In accordance with another feature of the invention, the frequency of the radar signal is varied by the radar equipment at a first, high modulation rate when the speed of the vehicle is less than a first predetermined speed threshold.

In accordance with a further feature of the invention, the frequency of the radar signal is varied by the radar equipment at a second modulation rate, which is less than the first modulation rate, when the speed of the vehicle is greater than the first predetermined speed threshold.

In accordance with an added feature of the invention, a second modulation cycle is transmitted by the radar equipment at the second modulation rate and a first modulation cycle is transmitted at the first modulation rate when the speed of the vehicle is greater than the first predetermined speed threshold and less than a predetermined second speed threshold, and the second predetermined speed threshold is greater than the first predetermined speed threshold.

In accordance with an additional feature of the invention, the first modulation cycle and the second modulation cycle are transmitted alternately by the radar equipment.

In accordance with a concomitant feature of the invention, a first and a second modulation cycle are transmitted by the radar equipment.

The radar equipment transmits a radar signal at a high modulation rate at slow speeds. This results in a large frequency shift with range, in comparison with the Doppler frequency. Accurate determination of the distance at close range between 0 and 40 meters is achieved, as a function of an adjustable first speed, in an advantageous manner by the use of high modulation rates. The first speed threshold is preferably set at 20 km/h.

At the speeds which are above the first speed threshold, a low modulation rate can be used particularly advantageously.

In addition to a modulation cycle having a high modulation rate, which makes accurate distance measurement possible, in a development of the invention a modulation cycle is additionally carried out at a low modulation rate at a speed which is greater than the first speed threshold in order to measure the distance and relative speed of objects, in particular of vehicles, at long range (up to 200 meters).

A preferred embodiment of the circuit configuration is based on the radar equipment successively and alternately using a modulation cycle at a high modulation rate and a modulation cycle at a low modulation rate. This makes available both an accurate distance value for short range and an accurate distance value for long range.

Other features which are considered as characteristic for the invention are set forth in the appended claims.

Although the invention is illustrated and described herein as embodied in a circuit configuration having radar equipment for determining a distance or a relative speed, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
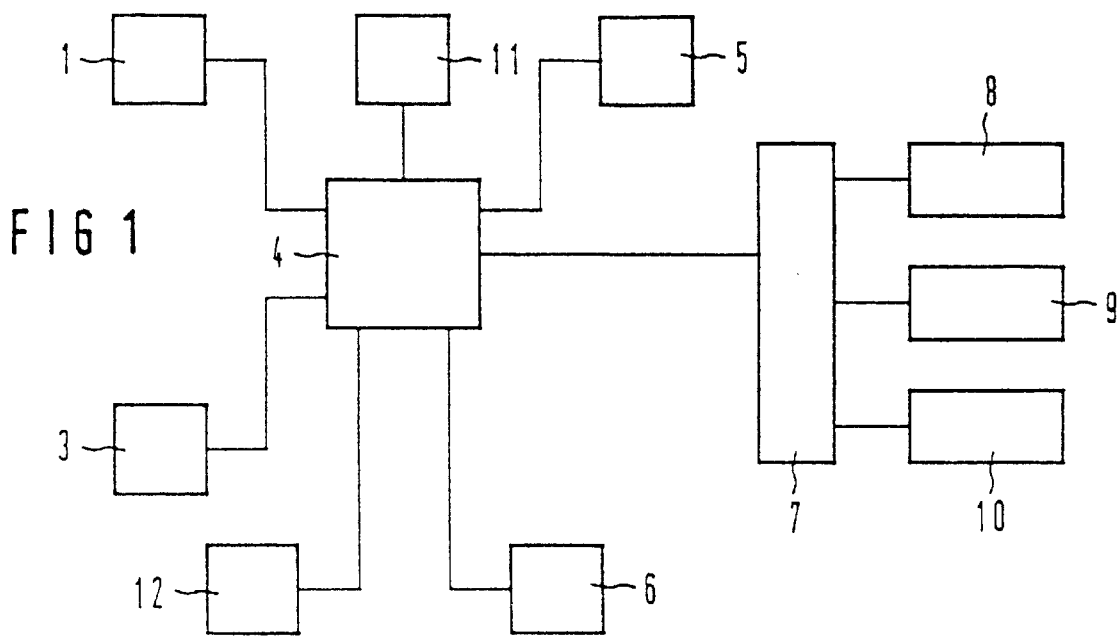
FIG. 1 is a block diagram of the circuit configuration according to the invention.

Referring now to the figures of the drawings in detail and first, particularly, to FIG. 1 thereof, there is seen a circuit configuration according to the invention, which is disposed in a motor vehicle. A computer unit 4 is connected through signal lines to a radar equipment 1 and to a sensor 3. Furthermore, the computer unit 4 is connected to a memory 11, to a display 5, to a databus 7 and to an interface 6. A control unit 8 for an automatic transmission, an engine control unit 9 and a control unit 10 for a braking system are connected to the databus 7. The sensor 3 is constructed as a speed sensor, which determines the speed of the vehicle. The radar equipment 1 has a transmitter and receiver for frequency-modulated radar beams.

The computer unit 4 is furthermore connected through a signal line to additional sensors 12. The additional sensors 12 determine weather conditions such as: rain, snow, fog, sunshine and roadway conditions such as: wet, slippery, roadway unevennesses and whether or not a flasher signal has been set.

Figure 2:
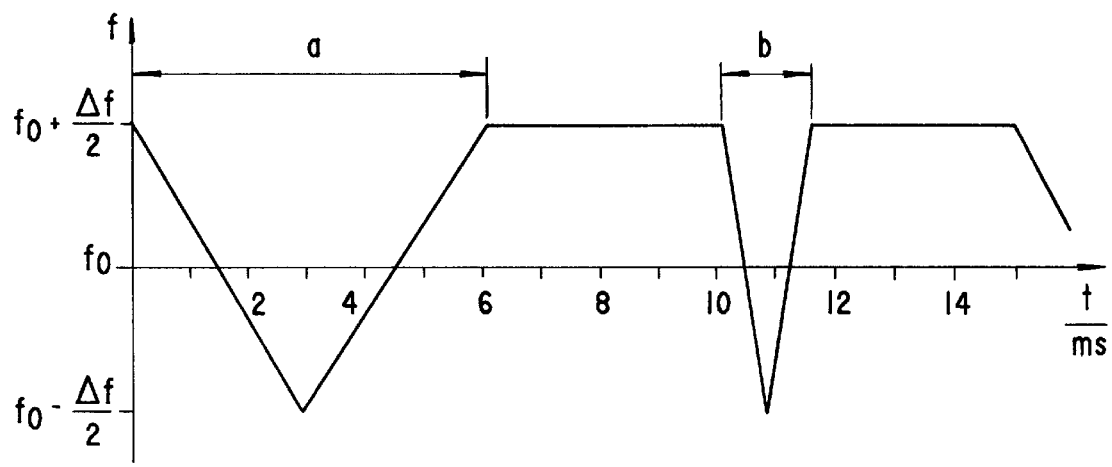
FIG. 2 is a diagram showing a first sequence of modulation cycles which are transmitted by radar equipment.

FIG. 2 shows a first modulation cycle a at a low modulation rate, and a second modulation cycle b at a high modulation rate. A change in frequency per unit time is referred to as the modulation rate. In FIG. 2, a frequency f is plotted against a time t (in milliseconds), with the origin being preset at a mid-frequency $f_0$. In one modulation cycle, the frequency of the frequency-modulated continuous-wave radar is reduced from a maximum frequency $$\left( f_0 + \frac{\Delta f}{2} \right)$$

at a first modulation rate to a minimum frequency $$\left( f_0 - \frac{\Delta f}{2} \right),$$

and is subsequently increased again at the first modulation rate to the maximum frequency $$\left( f_0 + \frac{\Delta f}{2} \right).$$

In FIG. 2, this takes place in a time period between 0 and 6 ms.

The first modulation cycle a is followed by an evaluation time for the first modulation cycle, in which the radar beams are emitted at a constant frequency. During the evaluation time, the computer unit 4 calculates the distance and/or the relative speed between the vehicle and an object, in particular another vehicle.

During the second modulation cycle b, the frequency of the emitted radar signal is reduced from the maximum frequency $$\left( f_0 + \frac{\Delta f}{2} \right)$$

at a second modulation rate, which is greater than the first modulation rate, to the minimum frequency $$\left( f_0 - \frac{\Delta f}{2} \right),$$

and is subsequently increased again to the maximum frequency at the second modulation rate. This is illustrated in FIG. 2 in the time period between 10 and 11.5 ms. This is followed by an evaluation time for the second modulation cycle, in which the computer unit 4 calculates the distance and/or the relative speed of the object.

The first modulation cycle a is carried out at the first modulation rate once again at the time t=15 ms. After a corresponding evaluation time, the second modulation cycle b is carried out once again at the second modulation rate. Reference symbol $f_0$ designates the mid-frequency and $\Delta f$ the modulation shift.

The radar signals are emitted by the radar equipment 1, are reflected by an object, for example a preceding vehicle, and are received again by the radar equipment. The distance and speed between one's own vehicle and the object are determined by the computer unit 4 from the comparison of the emitted radar signals with the received radar signals, using known methods (Published International Application Patent PCT/DE94/01382, corresponding to allowed U.S. application Ser. No. 08/651,564, filed May 22, 1996).

Figure 3:
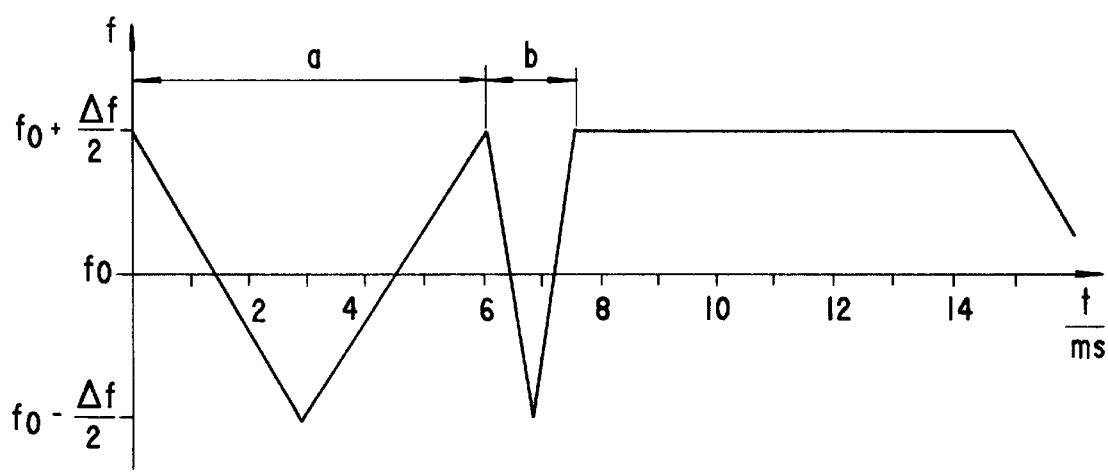
FIG. 3 is a diagram showing a second sequence of modulation cycles which are transmitted by the radar equipment.

FIG. 3 shows a method in which the first modulation cycle and the second modulation cycle are carried out directly after one another and an evaluation time follows subsequently for the first and the second modulation cycle. In FIG. 3, a first and a second modulation cycle are carried out once again after the time t=15 ms, followed by a subsequent evaluation time.

The radar signals are evaluated as follows:

A frequency shift $F_d$ is produced in the reflected radar signal because of the distance to the object:

$$F_d = 2 \cdot R(\Delta f/c \cdot T),$$

where $\Delta f$ is the frequency shift,
c is the speed of light,
T is the duration of half a modulation cycle, and
R is the distance to the preceding vehicle.

The relative speed between the vehicle in which the radar equipment is installed and the object leads to a Doppler frequency shift $F_v$ in the reflected radar signal:

$$F_v = 2 \cdot V_r (f_0/c),$$

where $f_0$=the mid-frequency,
$V_r$=the relative speed.

The frequency shift resulting from the range, and the Doppler frequency shift resulting from the relative speed lead to two different intermediate frequencies, which depend on whether the modulation rate is positive or negative, that is to say whether the frequency is being increased or reduced. When the frequency is being increased, that is to say when the frequency-modulated radar signal is increasing in frequency, a first intermediate frequency is produced:

$f_{zf1}=|f_d-f_v|$.

When the frequency is being reduced, that is to say when the frequency-modulated radar signal is reducing in frequency, this results in a second intermediate frequency $f_{zf2}=|f_d+f_v|$.

Fast Fourier Transformations are calculated for the evaluation of the intermediate-frequency signals. The spectral sampling interval for the calculation of the Fast Fourier Transformations determines the resolution capability for the distance and the relative speed. If a higher sampling rate is selected for the same modulation rate, then a plurality of sample points can be processed during the signal evaluation, so that a higher computation complexity is required.

When the scanning frequency is increased, the range resolution and the speed resolution remain constant, but the measurement range is expanded. If the modulation rate is increased at the same sampling rate, then the range in which the distance can be determined is reduced. An increase in the modulation rate by a factor of 2 leads to the range in which the distance to the object can be determined being halved. On the other hand, the range resolution is improved. The speed resolution remains constant.

The use of high modulation rates which are, for example, greater than 250 MHz/ms makes it possible to achieve a precise determination of the distance to the object, in particular to a vehicle, at close range from 0 to 40 meters.

The first, low modulation rate is, for example, 75 MHz/ms, the second, high modulation rate is, for example, 300 MHz/ms, the mid-frequency is, for example, 76.5 MHz and the frequency shift is preferably 225 MHz.

Figure 4:
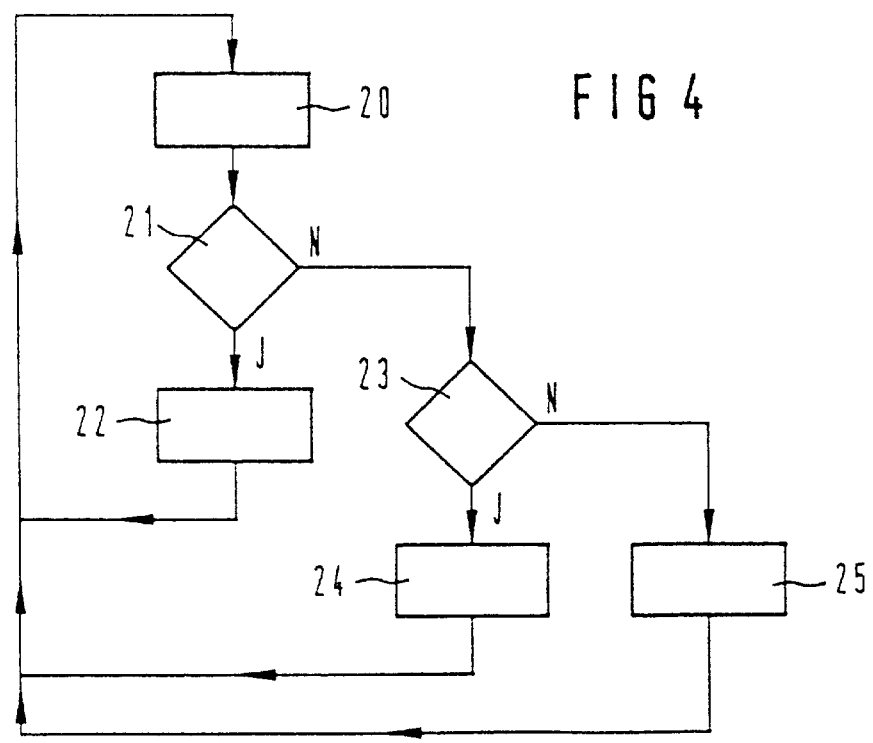
FIG. 4 is a flow chart of a program which is executed by the circuit configuration according to FIG. 1.

FIG. 4 schematically shows a program which the circuit configuration in FIG. 1 executes. At a program item 20, the computer unit 4 uses the sensor 3 to determine the speed of the vehicle in which the radar equipment is installed. At a program item 21, the computer unit 4 then checks whether or not the speed of the vehicle is above the first predetermined speed threshold. In this exemplary embodiment, the first predetermined speed threshold is set at 20 km/h. If the speed is less than the first predetermined speed threshold, then the radar equipment 1 is actuated at a program item 22 by the computer unit 4 in accordance with a first measurement method. The first measurement method includes only modulation cycles at a high modulation rate being carried out for the frequency-modulated radar signals, that is to say a radar signal is transmitted and received corresponding to the second modulation cycle b. First modulation cycles a at a low modulation rate are also optionally transmitted and received by the radar equipment.

After a predetermined time interval of one second, a jump is made back to the program item 20, and the program starts again.

If the question in program item 21 results in the answer that the speed of the vehicle is above the first predetermined speed threshold, then a second question is asked in a program item 23, which checks whether the speed of the vehicle is above a second, predetermined speed threshold. The second, predetermined speed threshold is fixed at 60 km/h in this exemplary embodiment. If it is found in the second question in the program item 23 that the speed of the vehicle is above the second predetermined speed threshold, then the computer unit 4 controls the radar equipment 1, at a program item 24, in accordance with a second measurement method. The second measurement method includes the radar signals being transmitted and received by the radar equipment only in the form of the first modulation cycles a, at a low modulation rate.

After a predetermined time interval of one second, a jump is made back to the program item 20, and the program starts again.

If the second question at the program item 23 results in the speed of the vehicle being less than the predetermined second speed threshold and greater than the first predetermined speed threshold then, in a program item 25, the radar equipment 1 is actuated by the computer unit 4 in accordance with a third measurement method. The third measurement method includes the radar equipment 1 transmitting radar signals alternately in the form of the first modulation cycle a at a first, low modulation rate and in the form of the second modulation cycle b at a second, high modulation rate.

Instead of the speed thresholds which are used, in which a change is made between a low and a high modulation rate, the modulation rate is continuously matched to the speed of the vehicle in a special embodiment of the invention, in such a manner that the modulation rate is increased as the speed reduces. The modulation rate in this case is interpolated in a suitable manner for the speed of the vehicle, corresponding to the predetermined speeds of 20 km/h and 60 km/h and the corresponding modulation rates of 75 MHz/ms and 300 MHz/ms. The interpolation is carried out, for example linearly or hyperbolically, depending on vehicle-dynamic aspects. Normally, linear interpolation is carried out.

If the evaluation of the reflected radar signals gives the result that the distance or the relative speed of the object is less than or greater than a predetermined distance or a predetermined relative speed, then the computer unit passes a warning signal to the driver with the display 5 and preferably acts on the automatic transmission 8, the engine control unit 9 or the braking system 10, in order to prevent a possible accident or in order to increase the distance to the vehicle in front. An airbag control unit is also preferably actuated.

The distances and the relative speeds at which a display or an intervention takes place are dependent on the environmental conditions, such as the weather or the roadway state. The schematic program which is illustrated in FIG. 4 is stored in the memory 11. The predetermined speed thresholds, the relative speeds and the distance at which a warning or an intervention is carried out can be varied through the interface 6.

The interface 6 is constructed, for example, in the form of an input and output unit through the use of which the current values for the speed thresholds, the relative speeds and the distance can be called up and varied through a keyboard.

I claim:

1. A circuit configuration, comprising:
   a speed sensor disposed on a vehicle in which the circuit configuration is disposed, for measuring the speed of the vehicle; and
   a radar equipment for determining a distance or a relative speed between the vehicle and an object;
   said radar equipment emitting a frequency-modulated radar signal, receiving a reflected radar signal and determining the distance or the relative speed from a comparison of the emitted radar signal with the received radar signal; and
   said radar equipment varying the frequency of the radar signal at a modulation rate depending on the speed of the vehicle and rising as the speed of the vehicle reduces.

2. The circuit configuration according to claim 1, wherein the object is another vehicle.

3. A method for operating a circuit configuration, which comprises:
   measuring a speed of a vehicle with a speed sensor disposed on the vehicle in which the circuit configuration is disposed;

determining a distance or a relative speed between the vehicle and an object with radar equipment by emitting a frequency-modulated radar signal from the radar equipment, receiving a reflected radar signal and determining the distance or the relative speed from a comparison of the emitted radar signal with the received radar signal; and varying a frequency of the radar signal by the radar equipment at a modulation rate depending on the speed of the vehicle and rising as the speed of the vehicle reduces, and producing a first, high modulation rate when the speed of the vehicle is less than a first predetermined speed threshold.

4. The method according to claim 3, which comprises:

varying the frequency of the radar signal by the radar equipment at a second modulation rate, which is less than the first modulation rate, when the speed of the vehicle is greater than the first predetermined speed threshold.

5. The method according to claim 4, which comprises:

transmitting a second modulation cycle by the radar equipment at the second modulation rate and transmitting a first modulation cycle at the first modulation rate when the speed of the vehicle is greater than the first predetermined speed threshold and less than a predetermined second speed threshold, the second predetermined speed threshold is greater than the first predetermined speed threshold, and during the first modulation cycle and the second modulation cycle the radar equipment decreases the frequency of the radar signal from a maximum frequency to a minimum frequency and subsequently increases the frequency back to the maximum frequency.

6. The method according to claim 5, which comprises:

transmitting alternately the first modulation cycle and the second modulation cycle by the radar equipment.

7. The method according to claim 3, which comprises:

transmitting a first and a second modulation cycle by the radar equipment, the radar equipment decreasing the frequency of the radar signal with the first modulation rate from a maximum frequency to a minimum frequency in the first modulation cycle and then subsequently increasing the frequency back to the maximum frequency, the radar equipment decreasing the frequency of the radar signal with the second modulation rate from a maximum frequency to a minimum frequency in the second modulation cycle and then subsequently increasing the frequency back to the maximum frequency.

* * * * *